US009177550B2

(12) United States Patent
Yu et al.

(10) Patent No.: US 9,177,550 B2
(45) Date of Patent: Nov. 3, 2015

(54) CONSERVATIVELY ADAPTING A DEEP NEURAL NETWORK IN A RECOGNITION SYSTEM

(71) Applicant: Microsoft Corporation, Redmond, WA (US)

(72) Inventors: Dong Yu, Bothell, WA (US); Kaisheng Yao, Newcastle, WA (US); Hang Su, Beijing (CN); Gang Li, Beijing (CN); Frank Seide, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 13/786,470

(22) Filed: Mar. 6, 2013

(65) Prior Publication Data

US 2014/0257803 A1     Sep. 11, 2014

(51) Int. Cl.
*G10L 15/16* (2006.01)
*G06N 3/04* (2006.01)
*G06N 3/08* (2006.01)
*G10L 15/20* (2006.01)
*G10L 15/07* (2013.01)

(52) U.S. Cl.
CPC ............. *G10L 15/16* (2013.01); *G06N 3/0481* (2013.01); *G06N 3/084* (2013.01); *G10L 15/07* (2013.01); *G10L 15/20* (2013.01)

(58) Field of Classification Search
CPC .................. G06T 7/0012; G06T 2207/30088; A61B 5/0077; A61B 5/444; A61B 2576/02; G10L 15/16; G10L 15/02; G06N 3/084; G06N 3/0454; G06N 3/0481; G06N 3/08; G06N 99/005; G06K 9/00288; G06K 9/00228

USPC ......... 704/202, 232; 706/20, 25, 27; 382/156, 382/157, 158

See application file for complete search history.

(56) References Cited

U.S. PATENT DOCUMENTS

| 7,886,266 | B2 | 2/2011 | Kienzle et al. |
| 8,345,962 | B2 * | 1/2013 | Yu et al. .................. 382/157 |
| 2005/0044053 | A1 | 2/2005 | Moreno et al. |
| 2006/0224532 | A1 | 10/2006 | Duan et al. |
| 2010/0063948 | A1 | 3/2010 | Virkar et al. |
| 2012/0065976 | A1 | 3/2012 | Deng et al. |
| 2012/0072215 | A1 | 3/2012 | Yu et al. |
| 2012/0143907 | A1 | 6/2012 | Turnbull et al. |
| 2012/0226654 | A1 | 9/2012 | Waldock et al. |
| 2012/0245919 | A1 | 9/2012 | Aradilla et al. |

OTHER PUBLICATIONS

"International Search Report & Written Opinion for PCT Patent Application No. PCT/US2014/020052", Mailed Date: Nov. 17, 2014, 13 Pages.

(Continued)

*Primary Examiner* — Charlotte M Baker
(74) *Attorney, Agent, or Firm* — Sandy Swain; Judy Yee; Micky Minhas

(57) ABSTRACT

Various technologies described herein pertain to conservatively adapting a deep neural network (DNN) in a recognition system for a particular user or context. A DNN is employed to output a probability distribution over models of context-dependent units responsive to receipt of captured user input. The DNN is adapted for a particular user based upon the captured user input, wherein the adaption is undertaken conservatively such that a deviation between outputs of the adapted DNN and the unadapted DNN is constrained.

20 Claims, 6 Drawing Sheets

(56) References Cited

OTHER PUBLICATIONS

Andrew, et al., "Sequential Deep Belief Networks", In IEEE International Conference on Acoustics, Speech and Signal Processing, Mar. 25, 2012, pp. 4265-4268.
He, et al., "Maximum Expected BLEU Training of Phrase and Lexicon Translation Models", In Proceedings of the 50th Annual Meeting of the Association for Computational Linguistics, vol. 1, Jul. 8, 2012, pp. 292-301.
Hsiao, et al., "Generalized Baum-Welch Algorithm and Its Implication to a New Extended Baum-Welch Algorithm", In Proceedings of 12th Annual Conference of the International Speech Communication Association, vol. 2, Aug. 28, 2011, pp. 773-776.
Kingsbury, Brian, "Lattice-Based Optimization of Sequence Classification Criteria for Neural-Network Acoustic Modeling", In IEEE International Conference on Acoustics, Speech and Signal Processing, Apr. 19, 2009, pp. 3761-3764.
Yu, et al., "Exploiting Sparseness in Deep Neural Networks for Large Vocabulary Speech Recognition", Retrieved at <<http://ieeexplore.ieee.org/stamp/stamp.jsp?arnumber=06288897>>, In IEEE International Conference on Acoustics, Speech and Signal Processing, Mar. 25, 2012, pp. 1-4.
Labbe, et al., "Learning Deep Neural Networks for High Dimensional Output Problems", Retrieved at <<http://asi.insa-rouen.fr/etudiants/~blabbe/publi/icmla09.pdf>>, In International Conference on Machine Learning and Applications, Dec. 13, 2009, pp. 1-6.
Dahl, et al., "Context-Dependent Pre-Trained Deep Neural Networks for Large Vocabulary Speech Recognition", Retrieved at <<http://citeseerx.ist.psu.edu/viewdoc/download;jsessionid=C731D21FC0BBC77717D02500CB795980?doi=10.1.1.227.8990&rep=rep1&type=pdf>>, In IEEE Transactions on Audio, Speech, and Language Processing, Special Issue on Deep Learning for Speech and Langauge Processing, Jan. 2012, pp. 1-13.
Seide, et al., "Conversational Speech Transcription using Context-Dependent Deep Neural Networks", Retrieved at <<http://research.microsoft.com/pubs/153169/CD-DNN-HMM-SWB-Interspeech2011-Pub.pdf>>, In 12th Annual Conference of the International Speech Communication Association, Aug. 2011, pp. 1-4.
Yu, et al., "Automated Directory Assistance System—from Theory to Practice", Retrieved at <<http://research.microsoft.com/pubs/75338/2007-yu-eurospeech.pdf>>, In 8th Annual Conference of the International Speech Communication Association, Aug. 2007, pp. 1-4.
Mohamed, et al., "Acoustic Modeling using Deep Belief Networks", Retrieved at <<http://www.cs.toronto.edu/~hinton/absps/speechDBN_jrnl.pdf>>, In IEEE Transactions on Audio, Speech and Language Processing, vol. 20, Issue 1, Jan. 2012, pp. 1-10.
Jaitly, et al., "Application of Pretrained Deep Neural Networks to Large Vocabulary Speech Recognition", Retrieved at <<http://www.cs.toronto.edu/~ndjaitly/techrep.pdf>>, In UTML TR 2012-001, Mar. 12, 2012, pp. 1-11.
Sainath, et al., "Making Deep Belief Networks Effective for Large Vocabulary Continuous Speech Recognition", Retrieved at <<http://citeseerx.ist.psu.edu/viewdoc/download?doi=10.1.1.224.860&rep=rep1&type=pdf, In the IEEE Workshop on Automatic Speech Recognition and Understanding, Dec. 2011, pp. 1-6.
Kingsbury, et al., "Scalable Minimum Bayes Risk Training of Deep Neural Network Acoustic Models using Distributed Hessian-Free Optimization", In 13th Annual Conference of the International Speech Communication Association, Sep. 9, 2012, pp. 1-4.
Hinton, et al., "Deep Neural Networks for Acoustic Modeling in Speech Recognition", Retrieved at <<http://psych.stanford.edu/~jlm/pdfs/Hinton12IEEE_SignalProcessingMagazine.pdf>>, In the IEEE Signal Processing Magazine, Nov. 2012, pp. 1-27.
Abrash, et al., "Connectionist Speaker Normalization and Adaptation", Retrieved at <<http://citeseerx.ist.psu.edu/viewdoc/download?doi=10.1.1.48.6904&rep=rep1&type=pdf>>, In Fourth European Conference on Speech Communication and Technology, Sep. 18, 1995, pp. 1-4.
Neto, et al., "Speaker-Adaptation for Hybrid Hmm-Ann Continuous Speech Recognition System", Retrieved at <<http://citeseerx.ist.psu.edu/viewdoc/download?doi=10.1.1.30.8156&rep=rep1&type=pdf>>, In Fourth European Conference on Speech Communication and Technology, Sep. 18, 1995, pp. 1-4.
Li, et al., "Comparison of Discriminative Input and Output Transformations for Speaker Adaptation in the Hybrid NN/HMM Systems", Retrieved at <<http://www.comp.nus.edu.sg/~li-bo/papers/is10_0526_adapt.pdf>>, In 11th Annual Conference of the International Speech Communication Association, Sep. 26, 2010, pp. 1-4.
Gemello, et al., "Linear Hidden Transformations for Adaptation of Hybrid Ann/Hmm Models", Retrieved at <<http://peer.ccsd.cnrs.fr/docs/00/49/91/63/PDF/PEER_stage2__10.1016%252Fj.specom.2006.11.005.pdf>>, In Journal of Speech Communication, vol. 49, Oct. 2007, pp. 1-19.
Liu, et al., "Improving LVCSR System Combination Using Neural Network Language Model Cross Adaptation", Retrieved at <<http://mi.eng.cam.ac.uk/~xI207/publications/conferences/IS2011-nnlmxa.pdf>>, In 12th Annual Conference of the International Speech Communication Association, Aug. 27, 2011, pp. 1-4.
Trmal, et al., "Adaptation of a Feedforward Artificial Neural Network using a Linear Transform", Retrieved at <<http://noel.feld.cvut.cz/gacr0811/publ/TRM10a.pdf>>, In Proceedings of the 13th International Conference on Text, Speech and Dialogue, Sep. 6, 2010, pp. 1-8.
Stadermann, et al., "Two-Stage Speaker Adaptation of Hybrid Tied-Posterior Acoustic Models", Retrieved at <<http://ieeexplore.ieee.org/stamp/stamp.jsp?tp=&arnumber=1415279>>, In IEEE International Conference on Acoustics, Speech and Signal Processing, Mar. 18, 2005, pp. 1-4.
Albesano, et al., "Adaptation of Artificial Neural Networks Avoiding Catastrophic Forgetting", Retrieved at <<http://cvsp.cs.ntua.gr/projects/pub/HIWIRE/HiwirePublications/ijcnn-2006.pdf>>, In International Joint Conference on Neural Networks, Jul. 16, 2006, pp. 1-8.
Li, et al., "Regularized Adaptation of Discriminative Classifiers", Retrieved at <<http://melodi.ee.washington.edu/vj/files/ICASSP-2006-Xiao.pdf>>, In IEEE International Conference on Acoustics, Speech and Signal Processing, May 14, 2006, pp. 1-4.
Dupont, et al., "Fast Speaker Adaptation of Artificial Neural Networks for Automatic Speech Recognition", Retrieved at <<http://ieeexplore.ieee.org/stamp/stamp.jsp?tp=&arnumber=862102>>, In IEEE International Conference on Acoustics, Speech and Signal Processing, Jun. 5, 2000, pp. 1-4.
Seide, et al., "Feature Engineering in Context-Dependent Deep Neural Networks for Conversational Speech Transcription", Retrieved at <<http://research.microsoft.com/pubs/157341/featureengineeringincd-dnn-asru2011-pub.pdf>>, In IEEE Workshop on Automatic Speech Recognition & Understanding, Dec. 11, 2011, pp. 1-6.
Yu, et al., "Factorized Deep Neural Networks for Adaptative Speech Recognition", Retrieved at <<http://research.microsoft.com/pubs/162504/f-DNN.pdf>>, In International Workshop on Statistical Maching Learning for Speech Processing, Mar. 2012, pp. 1-5.
Yu, et al., "The Deep Tensor Neural Network with Applications to Large Vocabulary Speech Recognition", Retrieved at <<http://ieeexplore.ieee.org/stamp/stamp/jsp?arnumber=06353550>>, In IEEE Transactions on Audio, Speech and Language Processing, Feb. 2013, pp. 1-9.
Snoek, et al., "Practical Bayesian Optimization of Machine Learning Algorithms", Retrieved at <<http://www.cs.toronto.edu/~jasper/bayesopt.pdf>>, Advances in Neural Information Processing Systems, Dec. 3, 2012, pp. 1-9.
Yu, et al., "A Novel Framework and Training Algorithm for Variable-Parameter Hidden Markov Models", Retrieved at <<http://citeseerx.ist.psu.edu/viewdoc/download?doi=10.1.1.187.8378&rep=rep1&type=pdf>>, In IEEE transactions on Audio, Speech and Language Processing, vol. 17, Issue 7, Sep. 2009, pp. 1-13.
Trmal, et al., "On Speaker Adaptive Training of Artificial Neural Networks", Retrieved at <<http://www.kky.zcu.cz/cs/publications/1/TrmalJan_2010_OnSpeakerAdaptive.pdf>>, In 11th Annual Conference of the International Speech Communication Association, Sep. 26, 2010, pp. 1-4.
Yu, et al., "Roles of Pre-Training and Fine-Tuning in Context-Dependent DBN-HMMs for Real-World Speech Recognition", Retrieved at <<http://research.microsoft.com/pubs/143619/dbn4asr-nips2010.pdf>>, In Proc. NIPS Workshop on Deep Learning and Unsupervised Feature Learning, Dec. 2010, pp. 1-8.

(56) References Cited

OTHER PUBLICATIONS

Gemello, et al., "Continuous Speech Recognition with Neural Networks and Stationary-Transitional Acoustic Units", In Proc. NN, 1997, pp. 2107-2111.

Xiao, et al., "An Initial Attempt on Task-Specific Adaption for Deep Neural Network-based Large Vocabulary Continuous Speech Recognition", In Proc. Interspeech '12, 2012, pp. 1-4.

Yao, et al., "Adaption of Context-Dependent Deep Neural Networks for Automatic Speech Recognition", in Proc. SLT' 12, 2012, pp. 1-4.

\* cited by examiner

CONSERVATIVELY ADAPTING A DEEP NEURAL NETWORK IN A RECOGNITION SYSTEM

BACKGROUND

Many different types of computer-implemented recognition systems exist, wherein such recognition systems are configured to perform some form of classification with respect to input data set forth by a user. For example, computer-implemented speech recognition systems are configured to receive spoken utterances of a user and recognize words in the spoken utterances. In another example, handwriting recognition systems have been developed to receive a handwriting sample and identify, for instance, an author of the handwriting sample, individual letters in the handwriting sample, words in the handwriting sample, etc. In still yet another example, computer-implemented recognition systems have been developed to perform facial recognition, fingerprint recognition, and the like.

With more particularity with respect to speech recognition, such type of recognition has been the subject of a significant amount of research and commercial development. For example, automatic speech recognition (ASR) systems have been incorporated into mobile telephones, desktop computers, automobiles, gaming consoles, customer service centers, etc., in order to recognize commands/questions and provide an appropriate response to such commands/questions. For instance, in a mobile telephone equipped with an ASR system, a user can utter a name of a contact retained in a contacts list on the mobile telephone, and the mobile telephone can initiate a call to the contact.

Even after decades of research, however, the performance of ASR in real-world usage scenarios remains far from satisfactory. Conventionally, hidden Markov models (HMMs) have been the dominant technique for larger vocabulary continuous speech recognition (LVCSR). In conventional HMMs used for ASR, observation probabilities for output states are modeled using Gaussian mixture models (GMMs). These GMM-HMM systems are typically trained to maximize the likelihood of generating observed features in training data. Recently, various discriminate strategies and large margin techniques have been explored. The potential of such techniques, however, is restricted by limitations of the GMM emission distribution model.

More recent research in ASR has explored layered architectures to perform speech recognition, motivated partly by the desire to capitalize on some analogous properties in the human speech generation and perception systems. In these studies, learning of model parameters (weights and weight biases corresponding to synapses in such layered architectures) has been one of the most prominent and difficult problems. In parallel with the development in ASR research, recent progresses made in learning methods from neural network research have ignited interest in exploration of deep neural networks (DNNs). A DNN is a densely connected directed belief network with many hidden layers. In general, DNNs can be considered as a highly complex, nonlinear feature extractor with a plurality of layers of hidden units and at least one layer of visible units, where each layer of hidden units is learned to represent features that capture higher-order correlations in original input data.

Conventionally, ASR systems that utilize DNNs are trained to be speaker/channel independent. In other words, parameters (e.g., weights and weight biases) of the DNN are not learned with respect to a particular speaker and/or channel. This is for at least two reasons: first, it is often difficult to obtain a sufficient amount of training data to robustly learn the parameters for a speaker and/or channel, as most users do not desire to spend a significant amount of time providing labeled utterances to train an ASR system. Furthermore, DNNs typically have many more parameters due to wider and deeper hidden layers, and also have a much larger output layer that is designed to model senones directly. This makes adapting a DNN utilized in connection with speech recognition a relatively difficult task.

SUMMARY

The following is a brief summary of subject matter that is described in greater detail herein. This summary is not intended to be limiting as to the scope of the claims.

Described herein are various technologies pertaining to adapting at least one parameter of a deep neural network (DNN) that is employed in a recognition system, wherein the adaption is undertaken for a particular user or context. In an exemplary embodiment, the DNN can be employed in an automatic speech recognition (ASR) system as a portion of a context-dependent deep neural network hidden Markov model (CD-DNN-HMM) system. A computing device, such as a mobile telephone, a computing device in an automobile, a computing device in a call center, a gaming console, a server, etc., can include an ASR system that comprises a speaker independent (SI) CD-DNN-HMM system that has been trained utilizing training data from a plurality of different users. To improve recognition capabilities of the CD-DNN-HMM system for a particular user or context (e.g., a particular mobile phone), it may be desirable to adapt the DNN to the particular user or context. Technologies described herein can be employed to perform such adaption without requiring the user to set forth a large amount of training data.

In the context of ASR, DNNs are configured to directly model context dependent units, which are referred to herein as senones. A senone may be a triphone, a quinphone, or the like. A DNN in a SI ASR system, as noted above, can be trained utilizing training data corresponding to a plurality of different users. When a particular user sets forth a speech utterance that is desirably decoded through utilization of an ASR system that includes a DNN, the speech utterance is partitioned into a plurality of frames, and the output of the DNN for an individual frame is a probability distribution over the senones modeled by the DNN.

To avoid over-fitting to the training data for the particular user (e.g., a captured utterance of the user, often called adaptation data) when adapting the DNN for such user, such adapting can be undertaken in a conservative manner, such that a deviation in output between an unadapted DNN and an adapted DNN (a resultant DNN with parameters adapted using the adaptation data) is constrained. In an exemplary embodiment, this can be accomplished through regularizing a cost function when performing the adaption, although other approaches can also be employed to cause the adaption to be undertaken conservatively. For instance, in an exemplary embodiment, a Kullback-Leibler Divergence (KLD) regularization constraint can be added to the adaption criterion. Therefore, the senone distribution over multiple frames estimated by the adapted DNN is forced to be relatively close to the senone distribution estimated by the unadapted DNN.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
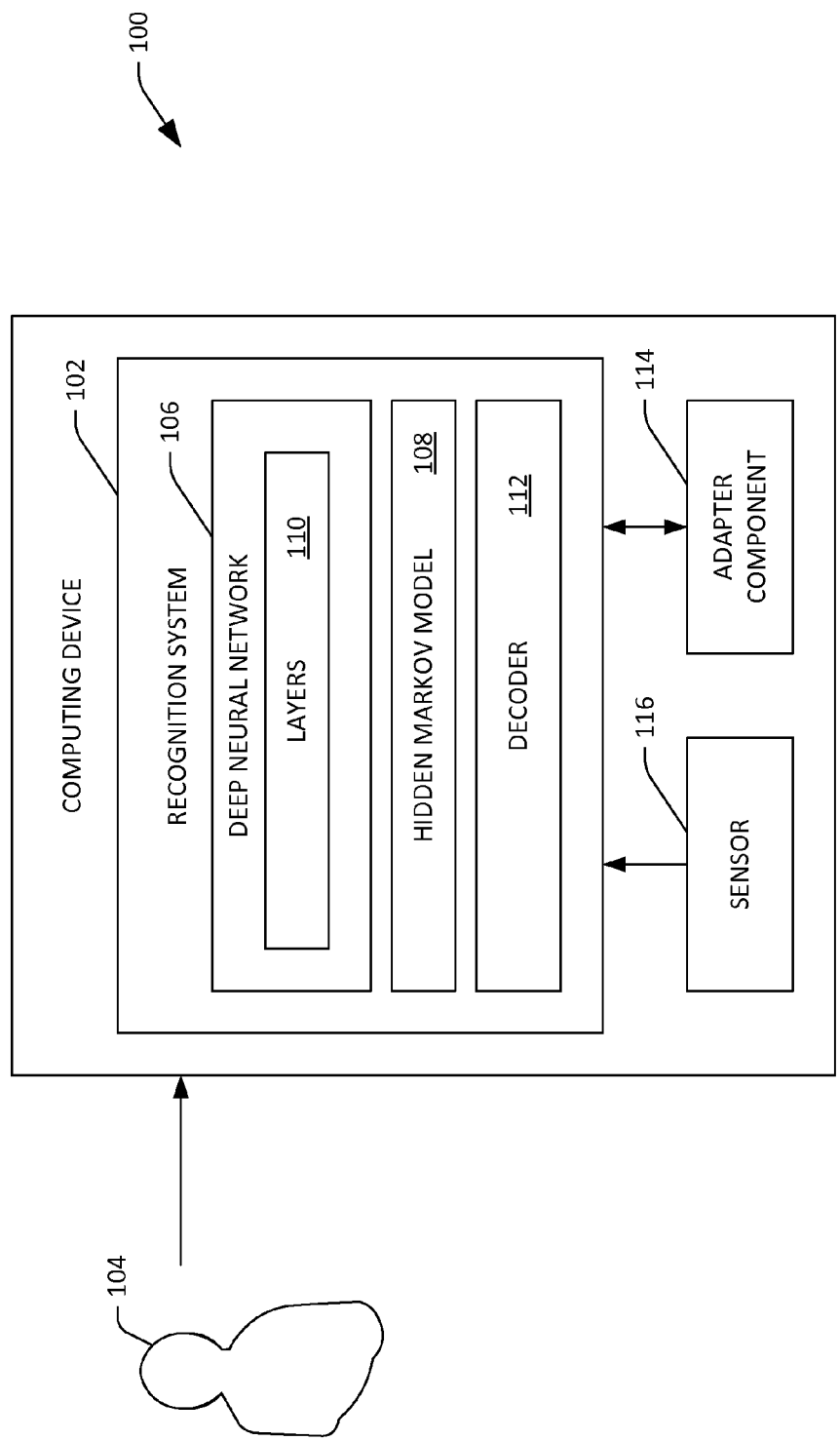
FIG. 1 is a functional block diagram of an exemplary computing device that includes a recognition system that comprises a DNN, wherein the DNN is adaptable to a particular user and/or context.

Various technologies pertaining to conservatively adapt parameters of a deep neural network to customize such deep neural network for a particular user or context are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary computing device 100 that comprises a recognition system 102 that can recognize input set forth by a user 104 of the computing device 100 is illustrated. The computing device 100 can be a client-side computing device, such as a mobile telephone, a gaming console, a desktop computer, a laptop computer, a tablet computing device (slate computing device), a computing device in an automobile, etc. In another example, the computing device 100 may be a computing device that is accessed remotely by the user 104 through utilization of a computing device or telephone, such as a computing device included in a customer service center that is remotely located from the user 104.

The recognition system 102 can be any suitable recognition system that can recognize user input. For example, the recognition system 102 may be a system for recognizing gestures set forth by the user 104, a system for recognizing characters in handwriting set forth by the user 104, an automatic speech recognition (ASR) system that can decode words in utterances set forth by the user 104, etc. For purposes of explanation, the recognition system 102 will be described herein as being an ASR system. It is to be understood, however, that the recognition system 102 can be any of the aforementioned types of recognition systems, that the adaption techniques for adapting model parameters described herein with respect to ASR systems can be employed in these other types of recognition systems.

In an exemplary embodiment, the recognition system 102 can include context-dependent-deep neural network-hidden Markov model (CD-DNN-HMM). A CD-DNN-HMM comprises a context-dependent deep neural network (which will be referred to herein as a deep neural network (DNN) 106) and a hidden Markov model 108 (HMM). The DNN 106 is a multi-layer perceptron with a plurality of layers 110. The plurality of layers 110 include an input layer (sometimes referred to as an observation layer) that receives an input observation, wherein the observation is provided to the DNN 106 over several frames (e.g. 9 to 13) of acoustic features. The plurality of layers 110 further comprises a plurality of hidden layers. For example, a number of hidden layers in the plurality of hidden layers can be at least three hidden layers. In some embodiments, a number of hidden layers in the plurality of hidden layers can be between three and ten hidden layers, between three and twenty hidden layer, between three and one hundred hidden layers, or between three and one thousand hidden layers.

Each hidden layer in the plurality of hidden layers comprises a respective plurality of nodes that are configured to perform nonlinear transformations on outputs of nodes from adjacent layers in the DNN 106. Thus, hidden layers in the DNN 106 are stacked one on top of another, such that output of a node in a first hidden layer is an input node in a second, immediately adjacent hidden layer that is above the first hidden layer in the DNN 106. Generally, in robust ASR systems that include a DNN, each hidden layer includes a relatively large number of nodes (e.g., at least one thousand nodes).

The plurality of layers 110 additionally includes an output layer, wherein the output layer includes models of context-dependent units (e.g., senones). In an exemplary embodiment, each senone modeled in the DNN 106 can be modeled as a multi-state HMM. The output of the DNN 106 is a probability distribution over modeled senones. The HMM 108 is generally employed to compute transition probabilities between such senones.

The recognition system 102 further comprises a decoder 112, which can decode at least one word in a spoken utterance of the user 104 based upon the output of the HMM 108. Generally, ASR systems that include CD-DNN-HMM systems have exhibited relatively high recognition accuracy rates when compared to conventional GMM-HMM ASR systems.

Oftentimes, it is desirable to train the DNN 106 in the recognition system 102 to be speaker independent (SI). For instance, generally, users do not wish to spend a significant amount of time setting forth training data to customize an ASR system for the voice and cadence of such users. Accordingly, the training data used to initially learn parameters of the DNN 106 may correspond to multiple different users, thereby causing the ASR system to be relatively robust across users. As will be described in greater detail herein, during training of the SI-DNN, both frame-level training and sequence-level training can be employed to learn parameters of the SI-DNN. Frame-level training refers to the learning of parameters of the DNN based upon individual frames, while sequence-level training refers to the learning of parameters of the DNN based upon a sequence of frames and other information such as language models. During training of the SI-DNN using the sequence-level criterion, it may be beneficial to regularize the sequence-level criterion by interpolating it with the frame-level criterion.

As the user 104 employs the recognition system 102, however, it may be desirable to adapt the DNN 106 to the user 104, since speech of such user 104 will have relatively unique characteristics (e.g., tone, pitch, cadence, . . . ).

To facilitate adaption of the DNN 106 to be customized for the user 104 of the computing device 100, the computing device 100 can include an adapter component 114 that adapts parameters of the DNN 106 based upon spoken utterances set forth by the user 104. As will be described in greater detail below, the adapter component 114 adapts the parameters of the DNN 106 conservatively, such that the output of the resultant adapted DNN is forced to be relatively similar to the output of the unadapted DNN (the DNN 106 prior to the adapter component 114 adapting parameters thereof). The adapted DNN can thereafter be employed to perform recognition tasks.

An example is set forth herein for purposes of explanation. Such example is not intended to be limiting as to the scope of the claims. The computing device 100 can be a mobile telephone that is being employed by the user 104 for a first time. The user 104 can initiate an application thereon that utilizes the recognition system 102 to recognize a spoken utterance of the user 104. A sensor 116 of the computing device 100 (a microphone) captures the spoken utterance of the user 104. The spoken utterance is received by the recognition system 102, which acts as described above to decode at least one word in the spoken utterance set forth by the user 104. The user may then set forth input that indicates whether or not the word recognized by the ASR system is correct.

Upon the DNN 106 receiving frames of acoustic features, nodes in hidden layers of the DNN 106 perform nonlinear transformations to produce higher ordered correlations between features, and outputs of nodes are passed via weighted synapses to other nodes. The output of the DNN 106 is a probability distribution over the senones modeled by the DNN 106. Using an expressed or inferred label (e.g., in unsupervised adaptation, the label can be inferred from a transcription output by the decoder 112), a respective target probability distribution over the senones for each frame can be identified for the spoken utterance of the user 104. Conventionally, parameters (weights and weight biases) of the DNN 106 are learned to maximize the negative cross entropy (averaged over the frames) between the probability distribution output by the DNN 106 and the target probability distribution. The adapter component 114 can adapt the parameters of the DNN 106 such that the probability distribution output by the adapted DNN for the spoken utterance set forth by the user 104 does not greatly deviate from the probability distribution output by the DNN 106 of the ASR that was included in the mobile telephone. Accordingly, for instance, the adapter component 114 can regularize the conventional learning process to cause the adaption of the DNN 106 based upon the spoken utterance set forth by the user 104 to be undertaken conservatively.

The regularization of the conventional learning process can include the utilization of a regularization weight. As the value of the regularization weight grows, the adaption of the DNN 106 undertaken by the adapter component 114 becomes more conservative. For example, as the value of the regularization weight becomes larger, less and less deviation between outputs of the adapted and unadapted DNNs occurs. Conversely, as the value of the regularization weight becomes smaller, more and more deviation between outputs of the adapted and unadapted DNNs may be observed.

In an exemplary embodiment, the adapter component 114 can select a value of the regularization parameter as a function of an amount of speech data received from the user 104. As more speech data is received from the user 104, a value of the regularization weight selected by the adapter component 114 can decrease. If adaption is to be undertaken based upon a smaller amount of speech data, the adapter component 114 can cause the value for the regularization weight to be larger (e.g., to avoid overfitting based upon the speech data from the user 104).

In another exemplary embodiment, the adapter component 114 can select the value of the regularization weight based upon whether supervised learning or unsupervised learning is employed to perform adaption. If supervised learning is employed to perform adaption (e.g., the speech data from the user is labeled—such as when the user 104 reads from a known text), the adapter component 114 can select a lower value for the regularization weight, thereby allowing for greater deviation in outputs of the unadapted and adapted DNNs. Conversely, if unsupervised learning is employed to perform adaption, then the adapter component 114 can select a larger value for the regularization parameter, thereby reducing an amount of deviation between outputs of the unadapted and adapted DNNs.

Furthermore, as noted above, the DNN 106 can include multiple hidden layers, each with hundreds or more (e.g., even thousands) nodes therein, and wherein each connection between nodes may have a respective weight and/or weight bias. Accordingly, a relatively large number of parameters for the DNN 106 can be learned by the adapter component 114 when adapting the DNN 106. In an exemplary embodiment, the adapter component 114 can adapt all parameters of the DNN 106. In other embodiments, the adapter component 114 can adapt a subset of parameters of the DNN 106. For instance, the adapter component 114 can cause parameters of a single hidden layer to be adapted, can cause parameters corresponding to certain nodes to be adapted, etc. Selectively updating a subset of parameters of the DNN 106 may be beneficial in situations where the computing device 102 has received a relatively large amount of speech data from the user 104, and there is a time constraint on the adapting of the DNN 106.

In some embodiments, the adapter component 114 can adapt parameters of the DNN 106 after each use of the recognition system 102. In another example, each time the computing device 100 is powered on, the adapter component 114 can ascertain if new speech data has been received from the user 102, and can adapt the DNN 106 in the speech recognition system 102 using any newly received speech data (e.g., where newly received speech data is speech data received since the last time the computing device 100 was powered on). Thus, the adapter component 114 can incrementally adapt a DNN over time. In still other embodiments, the adapter component 114 can continuously adapt a DNN as more and more speech data is received from the user 104.

In still yet another exemplary embodiment, the adapter component 114 can adapt the DNN 106 as the recognition system 102 is being utilized to perform a recognition task. Thus, the recognition system performance will be enhanced as the user 104 uses such recognition system 102. In such an exemplary embodiment, the user 104 can set forth an utterance which is decoded by the recognition system 102 as described above. This can, for example, result in a transcription of the spoken utterance, which is employed to identify a target probability distribution over senones for the spoken utterance. The adapter component 114 can adapt the DNN 106 based upon such target probability distribution (to form an adapted DNN), and the same spoken utterance can be provided to the recognition system 102, where the adapted DNN is employed in connection with decoding the utterance.

Additional detail pertaining to DNNs and the adaption process described above are now set forth. The information set forth with respect to FIG. 1 pertains to adaption (customized for a particular user and/or context); as indicated above, adaption can be can be carried out using frame-level criterion, sequence-level criterion, or an interpolated sequence-level and frame-level criterion. As indicated, the DNN 106 accepts an input observation x, which typically includes 9 to 13 frames of acoustic features, and processes it through many layers of nonlinear transformation as follows:

$$h_i^l = \sigma(z_i^l(v^l)) = \sigma((w_i^l)^T v^l + a_i^l), \tag{1}$$

where $w^l$ and $a^l$ are the weight matrix and bias, respectively, at hidden layer l, $h_i^l$ is the output of the ith node (neuron), $$z^l(v^l) = (w^l)^T v^l + a^l \tag{2}$$

is the excitation vector given input $v^l$, $v^l = h^{l-1}$ when l>0 and $v^0 = x$, and $\sigma(x) = 1/(1+\exp(-x))$ is the sigmoid function applied element-wise. At the top layer L, the softmax function $$p(y = s \mid v^L) = \frac{\exp((w_s^L)^T v^L + a_s^L)}{\sum_{y'} \exp((w_{y'}^L)^T v^L + a_{y'}^L)} \tag{3}$$

is used to estimate the state posterior probability p(y=s|x), which is converted to the HMM state emission probability as follows:

$$p(x \mid y = s) = \frac{p(y = s \mid x)}{p(y = s)} \cdot p(x), \tag{4}$$

where s∈{1, 2, ..., S} is a senone id, S is the total number of senones, p(y=s) is the prior probability of senone s, and p(x) is independent of state s.

Further, as noted above, the parameters of DNNs are conventionally trained to maximize a negative cross-entropy as follows:

$$\bar{D} = \frac{1}{N} \sum_{t=1}^{N} D(x_t) \tag{5}$$

$$= \frac{1}{N} \sum_{t=1}^{N} \sum_{y=1}^{S} \tilde{p}(y \mid x_t) \log p(y \mid x_t),$$

where N is the number of samples in the training set and $\tilde{p}(y|x_t)$ is the target probability. In some cases, a hard alignment from an existing system can be used as a training label under which condition $\tilde{p}(y|x_t) = \delta(y=s_t)$, where δ is a Kronecker delta and $s_t$ is the label of the t-th sample (e.g., the t-th observation frame in a training corpus). Pursuant to an example, training is often carried out using a back propagation algorithm and can be quickened using GPU and mini-batch updates.

The adapter component 114 adapts the DNN 106 such that the posterior senone distribution estimated from the adapted model does not deviate too far from that estimated using the unadapted model, particularly when the adaption set (data provided by the user 104) is relatively small.

Since outputs of the DNN 106 are probability distributions, deviation can be measured by the adapter component 114 using Kullback-Leibler Divergence (KLD). By adding such divergence as a regularization term to Eq. (5) and removing terms unrelated to the model parameters, the regularized optimization criterion employed by the adapter component 114 may be as follows:

$$\hat{D} = (1 - \rho)\bar{D} + \rho \frac{1}{N} \sum_{t=1}^{N} \sum_{y=1}^{S} p^{SI}(y \mid x_t) \log p(y \mid x_t), \tag{6}$$

where $p^{SI}(y|x_t)$ is the posterior probability estimated from the unadapted model and computed with a forward pass using the unadapted model, and ρ is the regularization weight. Eq. (6) can be re-organized as follows:

$$\hat{D} = \frac{1}{N} \sum_{t=1}^{N} \sum_{y=1}^{S} [(1 - \rho)\tilde{p}(y \mid x_t) + \rho p^{SI}(y \mid x_t)] \log p(y \mid x_t) \tag{7}$$

$$= \frac{1}{N} \sum_{t=1}^{N} \sum_{y=1}^{S} \hat{p}(y \mid x_t) \log p(y \mid x_t),$$

where $$\hat{p}(y|x_t) \triangleq (1-\rho)\tilde{p}(y|x_t) + \rho p^{SI}(y|x_t). \tag{8}$$

Through comparison of Eqs. (5) and (7), it can be ascertained that applying KLD regularization to the original training (optimization) criterion is equivalent to changing the target probability distribution from $\tilde{p}(y|x_t)$ to $\hat{p}(y|x_t)$, which is a linear interpolation of the distribution estimated from the unadapted model and the ground truth alignment of the adaption data. Such interpolation prevents overtraining by ensuring that output of the adapted DNN does not stray far from the unadapted DNN. It can be noted that this differs from L2 regularization, which constrains the model parameters themselves, rather than the output probabilities. This also indicates that the normal back propagation algorithm can be directly used to adapt the DNN 106, as all that changes is the error signal at the output layer of the DNN 106, which can be defined using $\hat{p}(y|x_t)$.

The interpolation weight, which can be directly derived from the regularization weight ρ, can be adjusted, typically using a development set, based on the size of the adaption set, the learning rate used, and whether the adaption is supervised or unsupervised. For instance, when ρ=1, the unadapted model is entirely trusted and all new information from the adaption data is ignored. When ρ=0, the model is adapted based solely on the adaption set, ignoring information from the unadapted model, except using it as a starting point.

While KLD has been set forth above as being employable by the adapter component 114 when adapting weights of the DNN 106, it is to be understood that the adapter component 114 can utilize other approaches when performing such adaption (or may use a combination of approaches to adapt parameters of the DNN 106). Pursuant to an example, certain parameters of the DNN 106 can be restricted from being adapted by the adapter component 114, which may effectively constrain deviation in outputs of the adapted DNN and unadapted DNN. For instance, the adapter component 114 may only adapt weights of synapses in the DNN 106 with an absolute value above a predefined threshold. In other examples, the adapter component 114 may be configured to only adapt weights of synapses with absolute values below a predefined threshold. In still yet another example, the adapter component 114 can be configured to adapt some percentage of parameters in the DNN 106, wherein parameters included in such percentage can be selected in any suitable manner. For instance, weights having absolute values in the top 10% of all weight values, can be subject to adaption, while the other 90% of weights are unadapted. Likewise, a certain percentage of parameters can be randomly selected for adaption, or parameters in a subset of layers can be adapted.

Figure 2:
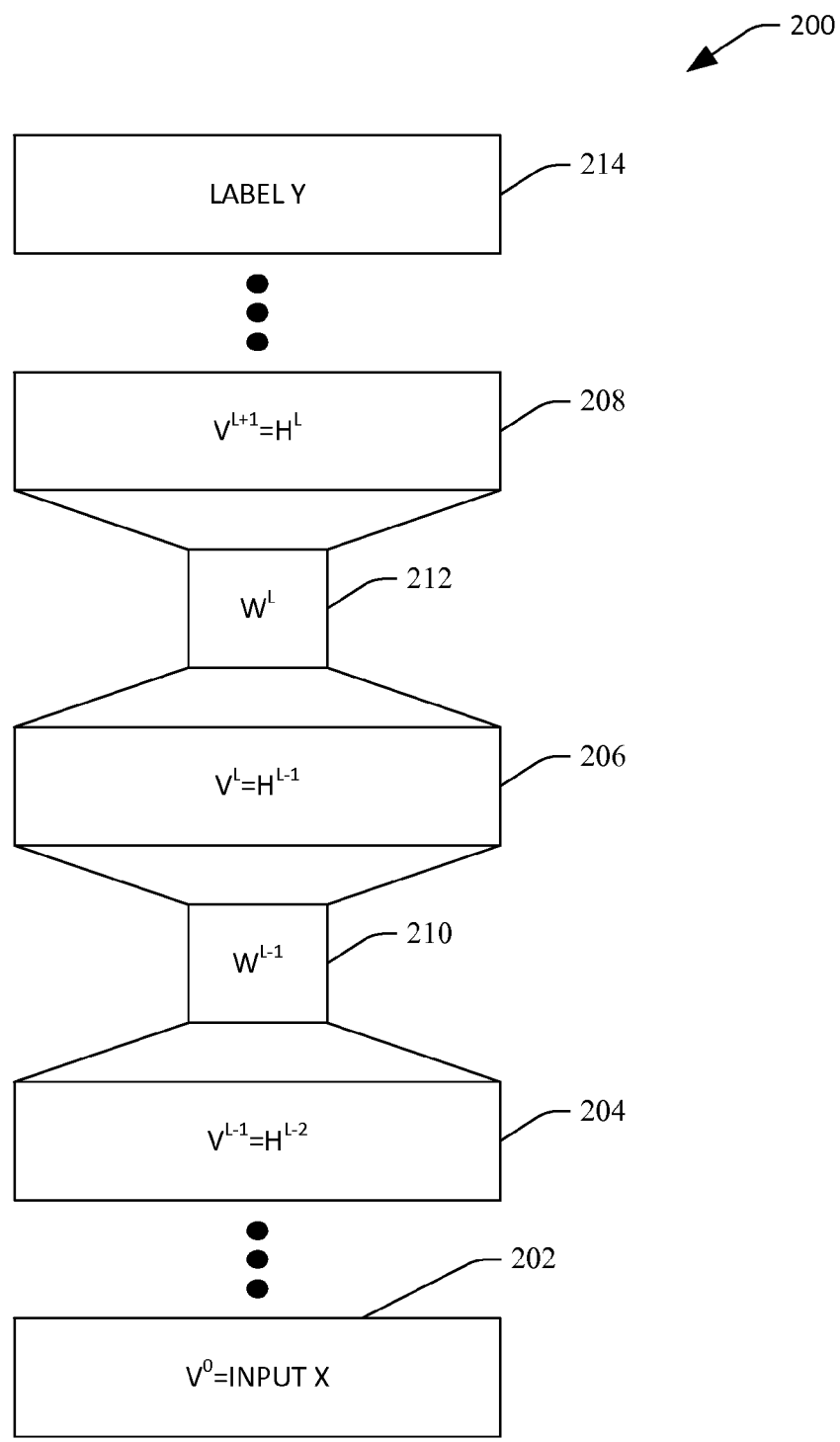
FIG. 2 illustrates an exemplary deep neural network.

Now turning to FIG. 2, a graphical representation of an exemplary DNN 200 is illustrated. The DNN 200 comprises an observed data layer 202, which captures an input sample in the form of a vector $V^0$. The input is denoted in FIG. 2 by X, which is an I×1 vector. The DNN further comprises a plurality of hidden layers 204-208. Each of the hidden layers 204-208 comprises a respective plurality of hidden units, and wherein each hidden unit comprises a respective activation function. Hidden units in adjacent layers are potentially connected by way of weighted synapses, which can be collectively represented by weight matrices 210 and 212 between hidden layers. As shown, the weight matrix 210 represents weighted synapses between hidden units in the hidden layer 204 (hidden layer $H^{L-2}$) and hidden units in the hidden layer 206 (hidden layer $H^{L-1}$). Similarly, the weight matrix 212 represents weighted synapses between hidden units in the hidden layer 206 and hidden units in the hidden layer 208 (hidden layer $H^L$). A layer 214 in the DNN 200 is the output, which is determined based upon the weighted synapses and activation functions of hidden units in the DNN 200. The output is denoted in FIG. 2 as Y. The adapter component 114 can adapt weights of the weight matrix 210 and/or the weight matrix 212, as well as weight biases when performing adaption.

Figure 3:
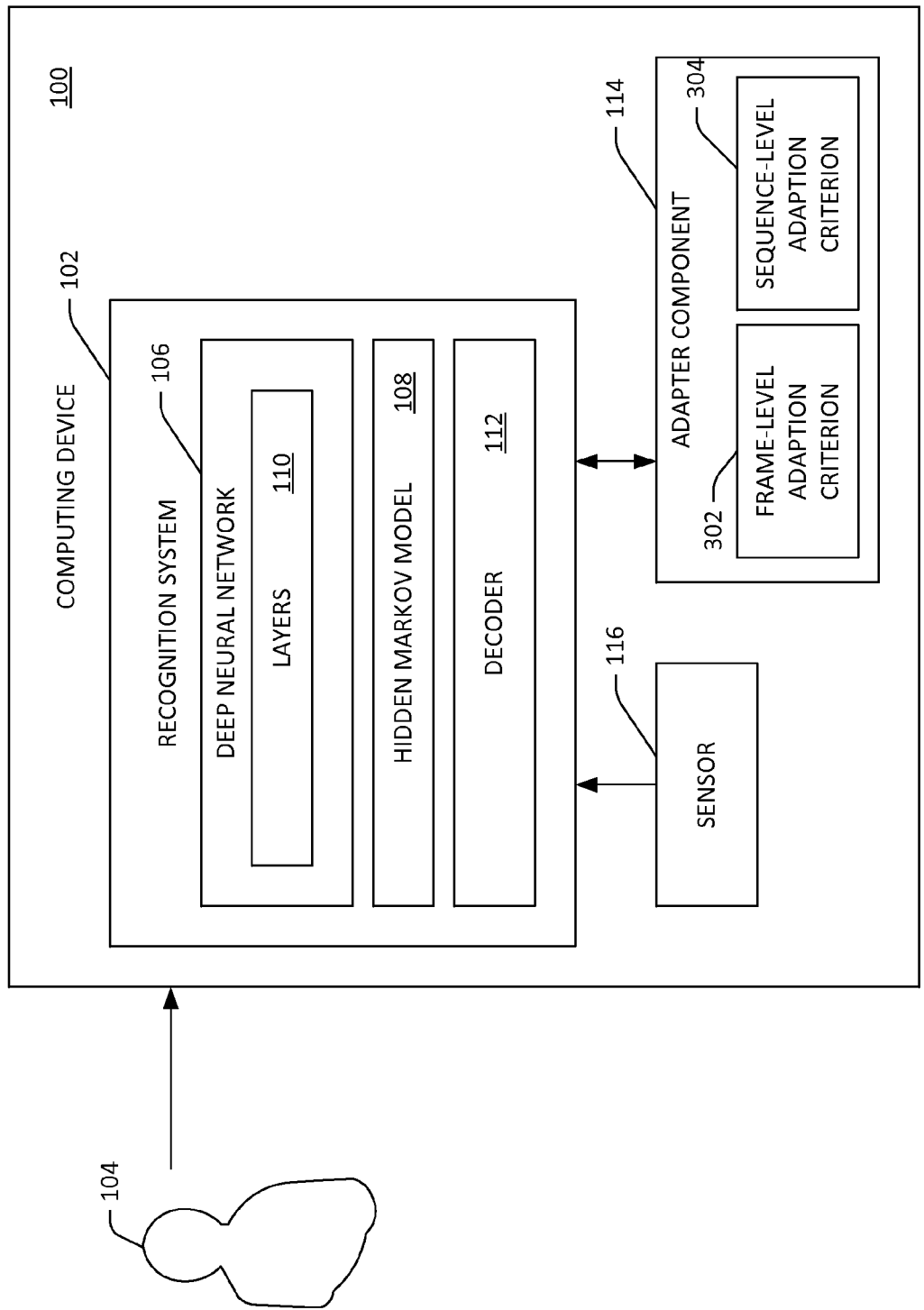
FIG. 3 is a functional block diagram of an exemplary system that facilitates adapting a DNN of a recognition system to a particular user.

With reference now to FIG. 3, the adapter component 114 is shown as being able to contemplate both frame level adaption criterion 302 and sequence level adaption criterion 304 when adapting parameters of the DNN 106. In sequence level training, cross entropy between outputs is calculated based upon a sequence of senones, rather than based upon probability of existence of senones in a certain frame. Accordingly, rather than adapting parameters of the DNN 106 solely using frame level criterion 302, the adapter component 114 can alternatively or additionally adapt parameters of the DNN 106 utilizing sequence level adaption criterion. If both frame level and sequence level adaption criterion are used, the adapter component 114 can interpolate between adaptions made based upon the frame level adaption criterion 302 and the sequence level adaption criterion 304. That is, the adapter component 114 can compute first adaption values, as described above, based upon frames, and the adapter component 114 can also determine adaption values based upon the sequence level adaption criterion 304. The adapter component 114 may subsequently interpolate between corresponding adaption values. Further, it is to be understood that both frame level and sequence level adaption criterion can be employed when initially learning parameters of the unadapted DNN (the SI-DNN). When sequence level criterion is used to train the SI-DNN, it may be beneficial to interpolate the sequence-level criterion with the frame-level criterion. During adaption, however, in an example, KLD can be added to the frame level criterion and/or the sequence level criterion, effectively restricting deviation in output between the adapted and unadapted model.

As noted above, a CD-DNN-HMM can model the posterior probability $P_{s|o}(s|o)$ of a senone s given an observation o. The CD-DNN-HMM includes a stack of (L+1) layers of log-linear models of the form $P(h^l|v^l)=1/Z^l \exp((W^l)^T v^l + a)$ with layer-type specific partition functions $Z^l$), weight matrices $W^l$ and bias vectors $a^l$ (the model parameters to train), and $v^l$ and $h^l$ denoting the input and output of each layer.

For hidden layers, the components of $h^l$ are assumed binary and conditionally independent, such that $P(h^l|v^l)$ has the form of a component-wise sigmoid. With the "mean-field approximation", the expected value of $h^l$ is used as the input to the next layer: $v^{l+1} \stackrel{d}{=} E_{h|v}^l \{h^l|v^l\}$. For the output layer, $h^L$ is a unit vector with the position of the 1 denoting the senone s: $P_{s|o}(s|o)=P(h_s^L=1|v^L)$. Such constraint gives rise to the form of softmax.

For decoding and lattice generation, the senone posteriors are converted in the HMM's emission likelihoods by dividing the senone priors $P_s(s)$:

$$\log p_{o|s}(o|s)=\log P_{s|o}(s|o)-\log P_s(s)+\log p_o(o), \quad (9)$$

where the observation vectors o are acoustic feature vectors augmented with neighbor frames. $p_o(o)$ is unknown but can be ignored, as it cancels out in best-path decisions and word-posterior computation. Likewise, $Z^L$ can be ignored in $P_{s|o}(s|o)$.

As referenced above, CD-DNN-HMMs can be trained with a stochastic-gradient error back-propagation method, typically after initialization through a pre-training step. Of relevance is an error signal of the top layer:

$$e_s(r,t) = \frac{\partial \mathcal{F}}{\log P_{s|o}(s \mid o^r(t))}, \quad (10)$$

where $\mathcal{F}$ $(W^0, a^0, \ldots, W^L, a^L)$ is the objective function to maximize over all training utterances' frames $O^r=(o^r(1), o^r(2), \ldots)$, with utterance index r.

An exemplary approach to train CD-DNN-HMMs is to maximize the total log posterior probability over training frames $o^r(t)$ with ground truth labels $\hat{s}^r(t)$. This is known as the cross entropy (CE) criterion (with Kronecker delta δ):

$$\mathcal{F}^{CE}=\Sigma_r \Sigma_t \log P_{s|o}(\hat{s}^r(t)|o^r(t)) \quad (11)$$

$$e_s^{CE}(r,t)=\delta_{s,\hat{s}^r(t)}-P_{s|o}(s|o^r(t)). \quad (12)$$

Sequence training incorporates HMM, lexical, and language model constraints of the actual mean average precision (MAP) decision rule. Popular sequence objectives, known from GMM systems, are maximum mutual information (MMI), boosted MMI (BMMI), and minimum Bayes risk (MBR), as set forth below:

$$\mathcal{F}^{MMI} = \sum_r \log P(\hat{s}^r \mid O^r) \quad (13)$$

$$\mathcal{F}^{BMMI} = \sum_r \log \frac{P(\hat{S}^r \mid O^r)}{\sum_{S'} P(S' \mid O^r) \cdot e^{-b \cdot A^r(S')}} \quad (14)$$

$$\mathcal{F}^{MBR} = \sum_r \sum_S P(S \mid O^r) \cdot A^r(S). \quad (15)$$

The P(S|O) are path posteriors given the current model:

$$P(S \mid O) = \frac{p^\kappa(O \mid S) P(S)}{\sum_{S'} p^\kappa(O \mid S') P(S')} \quad (16)$$

The acoustic likelihoods p(O|S) are computed using Eq. (9). The P(S) are path priors that consider HMM transitions, lexicon, and LM, and κ is the acoustic weight. $A^r(S)$ is the accuracy function. Its sMBR variant can be used, which counts correct frames in path S against ground truth $\hat{S}^r$. With s(t) denoting the senone on S at frame t, the error signals are:

$$e_S^{MMI}(r,t) = \delta_{S,\hat{S}(t)} - \gamma_S^r(t) \quad (17)$$

$$e_S^{MBR}(r,t) = \kappa \gamma_S^r(t) [E\{A^r(S) \mid s(t)=s\} - E\{A^r(S)\}] \quad (18)$$

with $$\gamma_S^r(t) = \sum_S \delta_{s(t),s} P(S \mid O^r),$$

$$A^r(S) = \sum_t \delta_{s(t),\hat{s}^r(t)},$$

and $$E\{A^r(S) \mid s(t)=s\} = \frac{\sum_S \delta_{s(t),s} P(S \mid O^r) \cdot A^r(S)}{\sum_S \delta_{s(t),s} P(S \mid O^r)}.$$

$e_S^{BMMI}(r, t)$ is the same as $e_S^{MMI}(r, t)$, except for a $\gamma_S^r(t)$ modified analogously to $\mathcal{F}^{BMMI}$. Such error signals can be computed efficiently using forward-backward procedures. Accordingly, sequence-training BP can reuse the existing CE BP machinery, augmented with an additional, more complex computation of the error signal.

Any of Eqs. (13)-(15) can be employed to initially learn weights and/or weight biases of the SI-DNN. As indicated above, during adaption based upon user-specific or context-specific adaption data, the aforementioned criterion can be augmented to include regularization criterion, which restricts deviation in output between the SI-DNN and the resultant adapted DNN.

Figure 4:
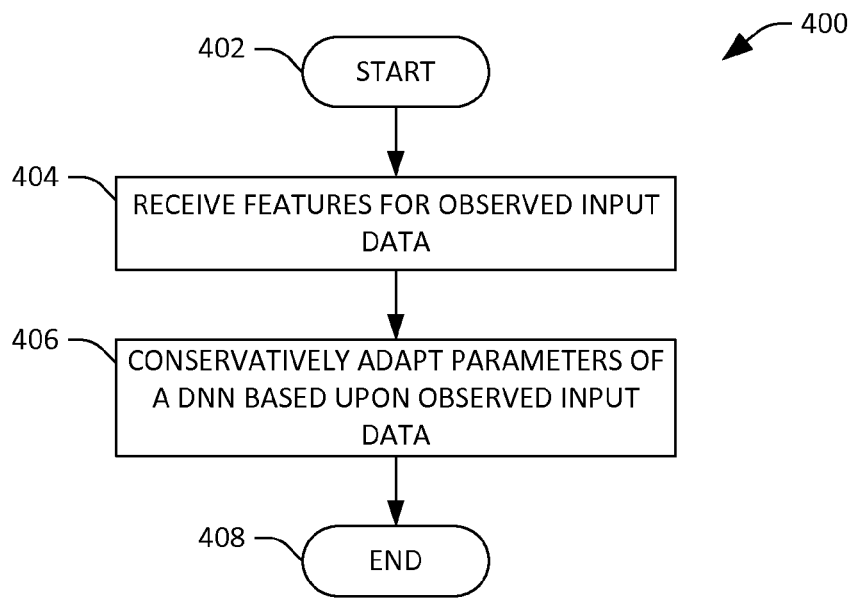
FIG. 4 is a flow diagram that illustrates an exemplary methodology for conservatively adapting parameters of a deep neural network based upon observed input data.
Figure 5:
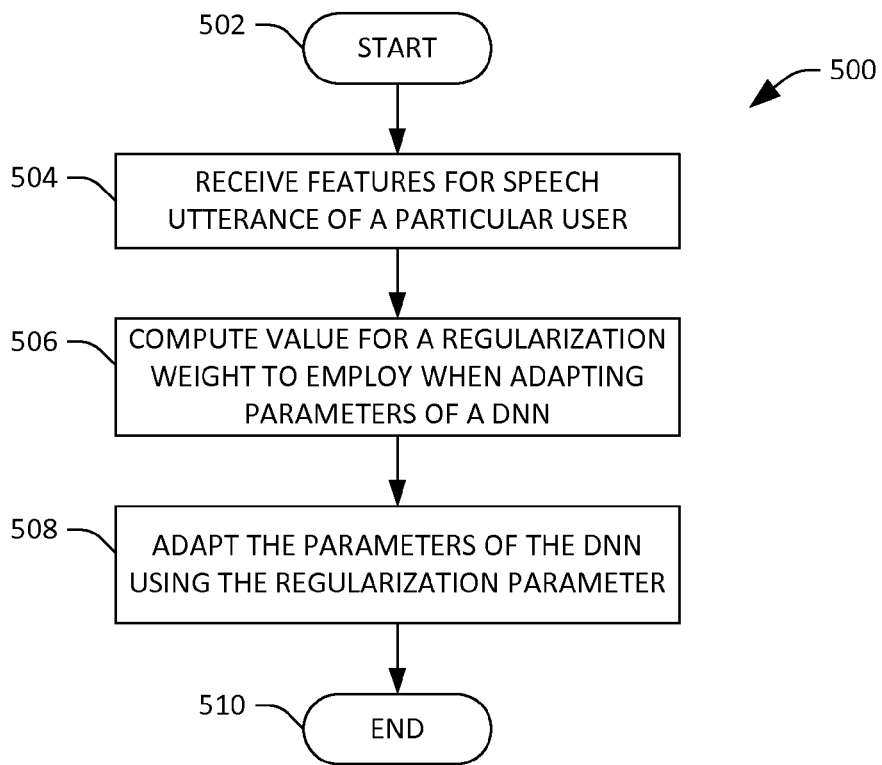
FIG. 5 is a flow diagram that illustrates an exemplary methodology for adapting parameters of a DNN based upon a regularization weight utilized in connection with regularizing a cost function.

FIGS. 4-5 illustrate exemplary methodologies relating to adapting parameters of a DNN. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to solely to FIG. 4, an exemplary methodology 400 that facilitates adapting a DNN used in a recognition system is illustrated. The methodology 400 starts at 402, and at 404 features for observed input data are received. For example, such features can be based upon a spoken utterance of a particular user.

At 406, parameters of a DNN are conservatively adapted based upon the input data observed at 404. As indicated above, conservative adaption refers to the constraint in deviation between probability distributions over context dependent phones between an unadapted model and the model that has been conservatively adapted. An amount of conservativeness can be based upon a regularization weight, a value for which can be selected based upon the length and/or amount of training data (the length of the spoken utterance). The resultant adapted DNN is customized for the user who set forth the input data. The methodology 400 completes at 408.

With reference now to FIG. 5, an exemplary methodology 500 that facilitates adapting parameters of a DNN using a regularization weight is illustrated. The methodology 500 starts at 502, and at 504 features for a spoken utterance of a particular user are received. At 506, a value for a regularization weight to employ when adapting parameters of a DNN is computed. Again, this can be computed as a function of amount of training data to be used when adapting parameters of the DNN, whether supervised learning or unsupervised learning is employed when performing the adaption, etc. At 508, the parameters of the DNN are adapted using the value for the regularization weight computed at 506. The methodology 500 completes at 510.

Figure 6:
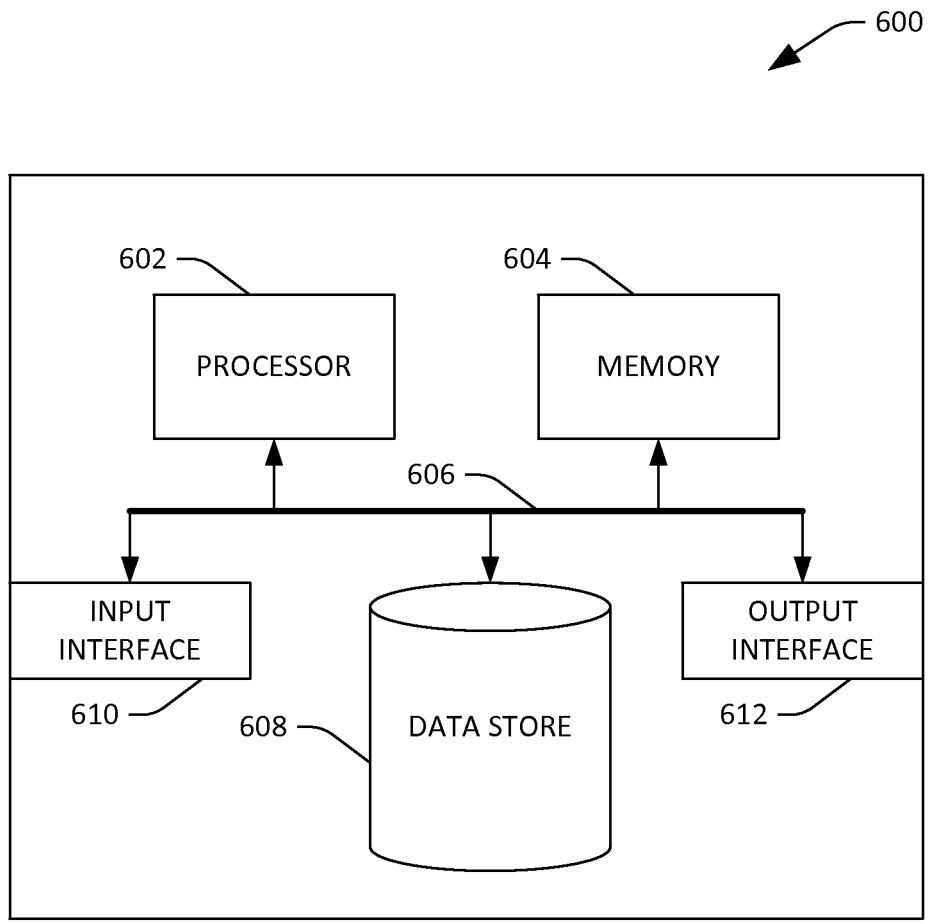
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that supports conservatively adapting a DNN of a recognition system for a particular user or context. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store matrix weights, weight of a regularization parameter, a weight bias, training data, etc.

The computing device 600 additionally includes a data store 608 that is accessible by the processor 602 by way of the system bus 606. The data store 608 may include executable instructions, learned parameters of a DNN, etc. The computing device 2600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising a recognition system, the recognition system comprising:
    a deep neural network (DNN) trained using training data corresponding to a plurality of users, the DNN parameterized by a plurality of parameters and comprising multiple layers, the multiple layers comprising:
        an input layer that receives features of a captured observation;
        a plurality of hidden layers, each hidden layer comprising a respective plurality of nodes, each node in a hidden layer being configured to perform a nonlinear transformation on output of at least one node from an adjacent layer in the DNN; and
        an output layer that comprises models of context-dependent units, the output layer receiving outputs of nodes from an uppermost hidden layer in the DNN, wherein output of the DNN comprises a probability distribution over the models of the context-dependent units; and
    an adapter component that conservatively adapts at least one parameter of the plurality of parameters to form an adapted DNN, wherein the adaptor component conservatively adapts the at least one parameter of the plurality of parameters such that deviation between outputs of the DNN and the adapted DNN is constrained.

2. The computing device of claim 1, wherein the adaptor component regularizes a cost function when conservatively adapting the at least one parameter, wherein Kullback-Leibler divergence is employed by the adaptor component when regularizing the cost function.

3. The computing device of claim 1, wherein the plurality of parameters comprise weights of synapses between nodes in adjacent layers of the DNN, and wherein the adapter component conservatively adapts the at least one parameter of the plurality of parameters by only adapting weights with absolute values above a predefined threshold.

4. The computing device of claim 1, wherein the plurality of parameters comprise weights of synapses between nodes in adjacent layers of the DNN, and wherein the adapter component conservatively adapts the at least one parameter of the plurality of parameters by only adapting weights with absolute values below a predefined threshold.

5. The computing device of claim 1, wherein the DNN comprises at least three hidden layers, and wherein each hidden layer in the DNN comprises at least one thousand nodes.

6. The computing device of claim 1, the recognition system being a speech recognition system, the captured observation being a spoken utterance, and the context-dependent units being senones.

7. The computing device of claim 6, wherein the adapted DNN is provided with the features corresponding to the spoken utterance immediately subsequent to the adaptor component adapting the at least one parameter of the DNN, the speech recognition system further comprises a decoder component that decodes at least one word in the spoken utterance utilizing the adapted DNN.

8. The computing device of claim 1 being a gaming console, the recognition system being one of a speech recognition system or a gesture recognition system.

9. The computing device of claim 1, wherein the adapter component adapts less than all adaptable parameters of the DNN when conservatively adapting the at least one parameter of the DNN.

10. The computing device of claim 1, wherein the adapter component employs a back propagation algorithm to conservatively adapt the at least one parameter of the DNN.

11. A method executed by a computing device comprising a speech recognition system, the speech recognition system including a deep neural network (DNN) trained using speech data from a plurality of users, the DNN comprising a plurality of learned parameters, the method comprising:
    receiving a spoken utterance of a particular user;
    responsive to receiving the spoken utterance, selecting a value of a regularization weight based at least in part upon a length of the spoken utterance in time; and
    responsive to selecting the value of the regularization weight, adapting at least one parameter of the plurality of learned parameters in the DNN based at least in part upon the regularization weight and the spoken utterance to form an adapted DNN, the adapted DNN being customized for the particular user.

12. The method of claim 11, wherein the adapting of the at least one parameter of the plurality of learned parameters in the DNN comprises adapting each parameter in the plurality of learned parameters in the DNN based at least in part upon the regularization weight and the spoken utterance.

13. The method of claim 11, wherein the adapting of the at least one parameter of the plurality of learned parameters in the DNN comprises utilizing Kullback-Leibler divergence with the value of the regularization weight to regularize an optimization function.

14. The method of claim 11, wherein the adapting of the at least one parameter of the plurality of learned parameters results in a deviation between a first output probability distribution over senones modeled in the adapted DNN and a second output probability distribution over the senones modeled in the DNN being constrained.

15. The method of claim 11, wherein the adapting of the at least one parameter of the plurality of learned parameters is undertaken using unsupervised learning.

16. The method of claim 11, further comprising:
    immediately subsequent to adapting the at least one parameter of the plurality of learned parameters to form the adapted DNN, utilizing the adapted DNN to recognize at least one word in the spoken utterance of the user.

17. The method of claim 11, wherein the at least one parameter is a weight assigned to a synapse in the DNN, wherein the weight is above a predefined threshold, and wherein the adapting of the weight is undertaken based at least in part upon the weight being above the predefined threshold.

18. The method of claim 11, wherein the adapting of the at least one parameter is based at least in part upon frame level evaluation of the spoken utterance and sequence level evaluation of the spoken utterance.

19. The method of claim 11 executed in a mobile telephone.

20. A computer-readable storage medium comprising instructions that, when executed by a processor, cause the processor to perform acts comprising:
    receiving a spoken utterance from a particular user;
    responsive to receiving the spoken utterance, accessing a speaker-independent deep neural network (SI-DNN), wherein the SI-DNN comprises at least three hidden layers and an output layer, the output layer comprising models of senones;
    converting the spoken utterance into a plurality of frames;
    providing the plurality of frames to the SI-DNN;
    receiving an output of the SI-DNN based upon the plurality of frames, the output being a probability distribution over the models of the senones; and
    adapting the SI-DNN to create an adapted DNN for the particular user based upon the plurality of frames, wherein the adapting of the SI-DNN is undertaken conservatively such that, with respect to the plurality of frames, a deviation between the probability distribution over the models of the senones output by the SI-DNN and a probability distribution output by the adapted DNN is constrained.

* * * * *